United States Patent [19]

Hata et al.

[11] Patent Number: 4,785,718
[45] Date of Patent: Nov. 22, 1988

[54] SPRING BRAKE CYLINDER

[75] Inventors: Yasuhisa Hata, Akashi; Osamu Akamatsu, Kobe, both of Japan

[73] Assignee: Nippon Air Brake Co., Ltd., Kobe, Japan

[21] Appl. No.: 32,104

[22] Filed: Mar. 27, 1987

[30] Foreign Application Priority Data

Mar. 28, 1986 [JP] Japan .................................. 61-71601

[51] Int. Cl.⁴ .............................................. F01B 9/00
[52] U.S. Cl. .................................... 92/29; 92/21 MR; 92/165 PR; 92/31; 92/130 A
[58] Field of Search ................. 92/29, 30, 17, 21 MR, 92/23, 24, 25, 26, 165 R, 165 PR, 166, 130 A, 31, 33

[56] References Cited

U.S. PATENT DOCUMENTS

| | | |
|---|---|---|
| 2,434,828 | 1/1948 | Ashton et al. ................. 92/21 MR |
| 2,813,518 | 11/1957 | Driskel et al. ................. 92/21 MR |
| 3,109,347 | 11/1963 | Brodl et al. ..................... 92/130 A |
| 3,668,977 | 6/1972 | Beidler ................................ 92/24 |
| 3,977,304 | 8/1976 | Meissner ......................... 92/130 A |
| 3,994,205 | 11/1976 | Ekdahl et al. ....................... 92/29 |
| 3,994,206 | 11/1976 | Dahlkvist et al. ................. 92/130 A |
| 4,063,491 | 12/1977 | Roger et al. ..................... 92/130 A |
| 4,080,875 | 3/1978 | Repolovsky ..................... 92/130 A |
| 4,080,876 | 3/1978 | Sturgess et al. ................. 92/130 A |
| 4,280,398 | 7/1981 | Kerscher et al. ................ 92/130 A |
| 4,480,531 | 11/1984 | Mylius et al. .................... 92/130 A |
| 4,552,056 | 11/1985 | McKay ............................ 92/130 A |
| 4,635,536 | 1/1987 | Liu et al. ............................. 92/24 |

*Primary Examiner*—Robert E. Garrett
*Assistant Examiner*—Thomas Denion
*Attorney, Agent, or Firm*—J. O. Ray, Jr.

[57] ABSTRACT

A spring brake cylinder assembly in which a pushrod connectable to a brake assembly is extendable from an end of such cylinder housing the piston member. The spring brake cylinder further includes a clutch release mechanism for manually releasing the brake force being applied.

7 Claims, 2 Drawing Sheets

SPRING BRAKE CYLINDER

This invention relates to the spring brake cylinder, which is disclosed in our Japanese Patent Application No. P61-71601, which is incorporated herein by reference thereto, which consists of the following parts: A cylinder body, a piston housed in the cylinder body, a brake spring which works to push back the piston to its normal position, a pushrod for braking which extends from the piston coaxially to come out of one of the ends of the cylinder body, a clutch which is located between the piston and the pushrod and makes connection and disconnection of their relative displacements in the axial direction, and an operation part which engages or disengages the clutch.

The invented spring brake cylinder has the following features: The clutch is altered to be equipped with a control part which makes a connection or disconnection by normal or reverse rotation. The control part can be moved along the axis together with the piston. Its one end is located inside the end part of the cylinder body. The other end relates to a transmission part, allowing the transmission of the rotational motion for the entire range of translational motion of the control part. An operation part is built crossing from the side exterior of the cylinder body to the transmission part. The control part can be rotated in normal and reverse directions by translational motions of the operation part through the transmission part.

DETAILED DESCRIPTION OF THE INVENTION

1. Industrial Application

This invention relates to a spring brake cylinder used for railroad cars as a parking brake, for example, especially the spring brake cylinder with a manual release mechanism.

2. Conventional Technology

Figure 4:
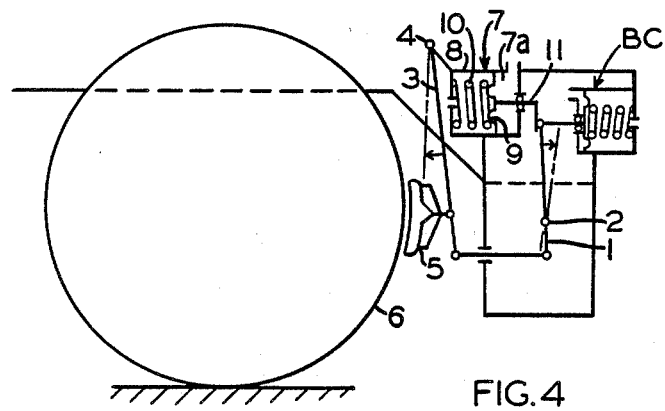

As shown in FIG. 4, conventional spring brake cylinders are employed as part of a brake unit or connected to a basic brake device through a brake lever. Normal brake operation is activated as follows: Compressed air is supplied to the brake cylinder BC in FIG. 4 from an air brake control device which is not shown. As a result, the piston rod is pulled in to let the lever 1 swing to the position indicated by a single dotted broken line with its middle position as a pivot 2. The suspending rod 3, being connected to the lever, swings as shown by a single dotted broken line with its top end as a pivot 4. The brake shoe 5 held by the suspending rod 3 will be pressed against the rim of the wheel 6 causing braking. When the compressed air is evacuated from the brake cylinder BC, the lever 1 and the suspending rod 3 are in the positions shown by solid lines in the figure and the brake is released.

The spring brake cylinder 7 is a separate unit from the brake cylinder BC for normal brake operation just described. In the figure, 8 shows the cylinder body, 9 the piston, 10 the spring for spring braking, and 11 is the pushrod. This spring brake cylinder 7 has its pushrod 11 connected to the lever 1. When the pushrod 11 moves to the right from the position shown in the figure, the condition of being connected to lever 1 causes the lever 1 to swing. The lever 1 alone can swing to the right freely, however. Normal braking operation with the brake cylinder BC is made with the pushrod 11 moved to the leftmost position as shown in the figure. The spring brake cylinder 7 is therefore not involved in the operation.

As mentioned above, the spring brake cylinder 7 is used, for example, to keep the brake set in parking. Its normal position is shown in the figure. When the compressed air in the cylinder room 7a is evacuated, the spring 10 will let the right end of the pushrod 11 push the top of the lever 1 to the right. This causes the lever 1 to swing and the brake will be applied in just the same way as the brake cylinder BC is activated.

When the brake is to be released with this type of brake cylinder 7, compressed air is supplied to the cylinder room 7a. A need for manual brake release mechanisms arises when cars in parking need to be moved quickly by swift release of the brake. For this reason, spring brake cylinders are equipped with a clutch which allows manual disconnection of the piston 9 and the pushrod 11.

One such example is described in the detailed description of U.S. Pat. No. 3,498,188. Also improved versions of this exist as U.S. Pat. Nos. 4,080,875 and 4,480,531. All of these require, in the manual release of the spring brake cylinder operation, or in disengaging the clutch, operation either pulling along the pushrod axis or rotation around this axis. The operation part is at the center of the end of the cylinder body.

PROBLEMS INTENDED TO BE SOLVED WITH THE PRESENT INVENTION

The spring brake cylinder used in railroad cars is attached to the wheeled base. There is very little space, especially at both ends of the cylinder, for the operation mechanisms for the manual release operation. For this reason, it is desirable to be able to release the brake with small force and simple operation perferably from the side of the wheeled base. With the conventional spring brake cylinder described above, however, the operation part is installed at the center of the cylinder body end. This makes operation more difficult. When a handle is attached at the end of the cylinder for translational operation along the axis, even if the necessary stroke may be obtained, its manual operation is extremely difficult because of limited free space. When the operation is a rotational one, it requires a special tool and this adds difficulties for the operation.

This invention makes it possible to build a spring brake cylinder which enables simple and speedy spring brake release from the side of the cylinder without tools.

METHODS TO SOLVE THE PROBLEMS

The methods in this invention relate to the brake cylinder which consists of the following parts: A cylinder body, a piston inside the cylinder body, a brake spring which works to push back the piston to its normal position, a pushrod for braking which extends from the piston coaxially to come out of one of the ends of the cylinder body, a clutch which is located between the piston and the pushrod and makes connections and disconnections of their relative displacements in the axial direction, and an operation part which engages or disengages the clutch. The present methods have the following features: The clutch is altered to be equipped with a control part which makes connection or disconnection by normal or reverse rotation. The control part can be moved along the axis together with the piston. Its one end is located inside the end part of the cylinder body. The other end relates to a transmission part, allowing the transmission of the translational motion for the entire range of translational motion of the control part. The operation part is built crossing from the side exterior of the cylinder body to the transmission part. The control part can be rotated in normal and reverse directions by translation motions of the operation part through the transmission part.

THEORY OF OPERATION

With the aforementioned methods, engagements and disengagements of the clutch are made by translational motion of the operation part. Since one end of the operation part is located at the exterior of the cylinder body side, the following method, for example, is possible. One can build a mechanism which disengages the clutch by pulling an operation part. In this method, the brake can be easily released, simply by pulling the operation part because one can take advantage of the free space outside the cylinder side in the operation.

EXAMPLES OF INSTALLATION

Figure 1:
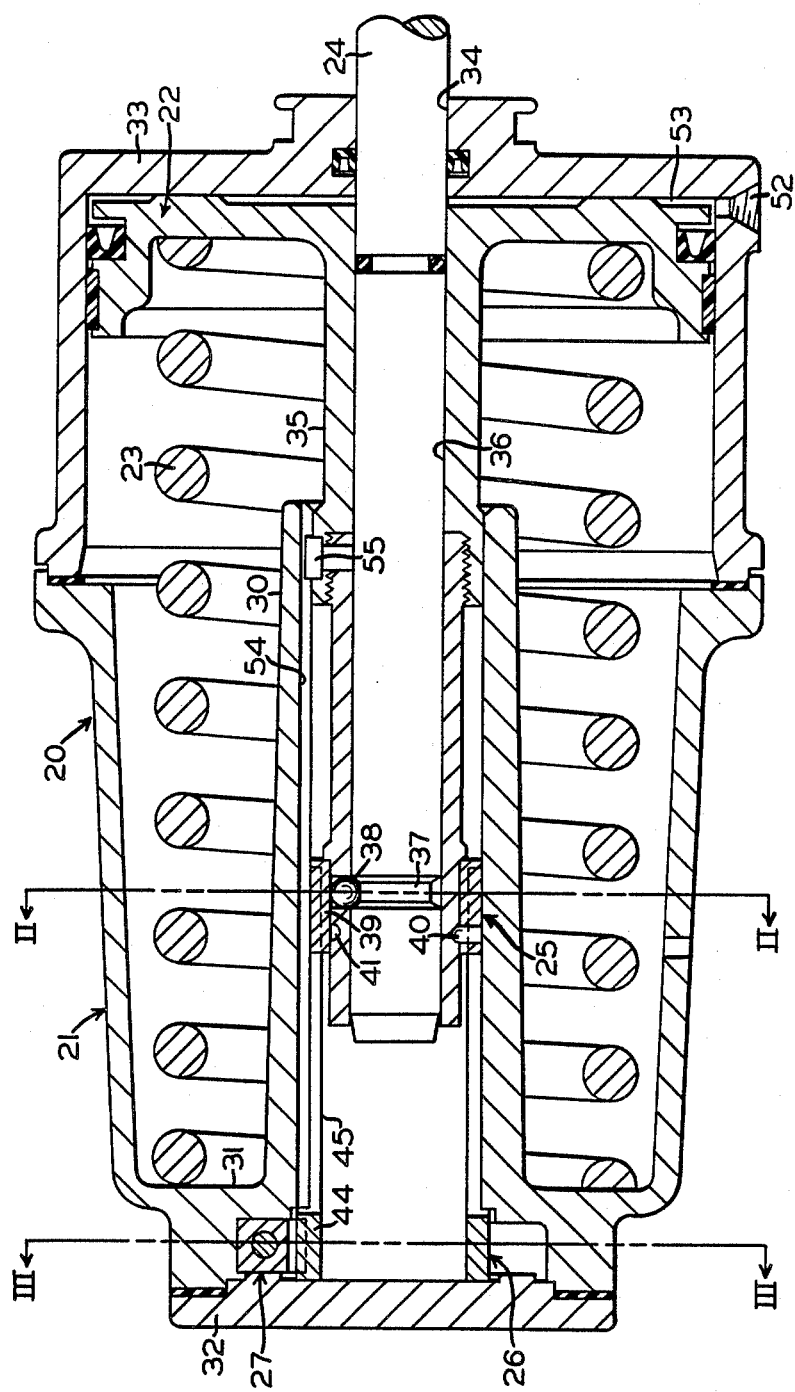
Figure 3:
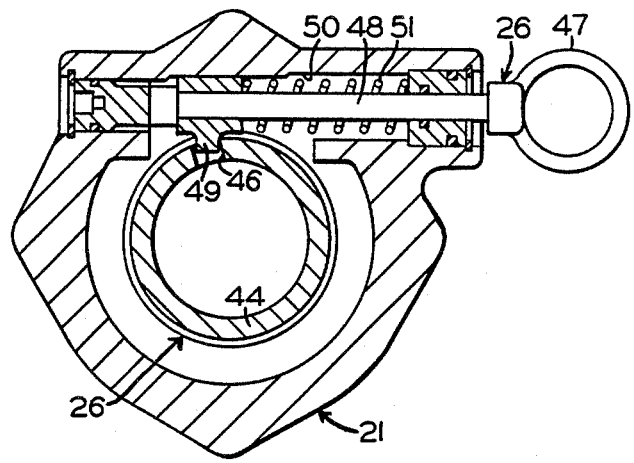

The first example of installation is illustrated in FIG. 1 and FIG. 3. In the figures, 20 indicates the whole brake cylinder assembly, 21 the cylinder body, 22 the piston, 23 the brake spring, 24 the pushrod, 25 the clutch, 26 the transmission part, and 27 is the operation part.

Inside the cylinder body 21, a cylindrical part 30 is formed extending from the end wall 31. The inner hole of the cylindrical part 30 is closed by a lid 32. A hole 34 is drilled in the other end wall 33. The pushrod 24 goes through an air tight seal.

The piston 22 is built to move between the cylindrical part 30 and the end wall 33 inside the cylinder body 21. At the one end, a cylindrical part 35 is formed to be guided by the hole of the cylindrical part 30. The pushrod 24 is inserted in the hole 36 which formed from the main body of the piston and extends to the cylindrical part 35.

A powerful spring 23 is installed for braking in the cylindrical body 21 between the end wall 31 and the piston 22.

While the one end of the pushrod 24 is inserted into the hole 34 of the cylinder body 21 and further into the hole 36 of the piston 22, the other end extends out of the cylinder body 21. The end of the extended part reaches the lever 1 as shown in FIG. 4.

Figure 2:
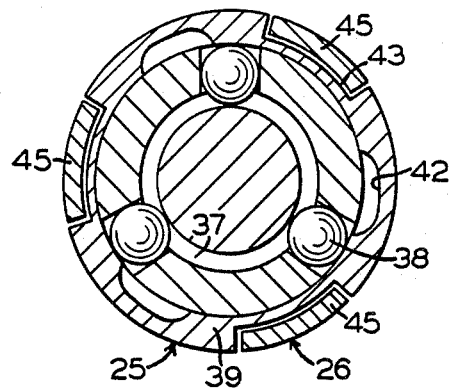

The clutch 25 is built to make connection and disconnection between the piston 22 and the pushrod 24 for the translational motions. This is a ball clutch in which the balls 38 are each held in the three holes in the cylindrical part 35 of the piston 22 against a ring-shaped channel 37 on the external surface of the pushrod 24. It is controlled by normal and reverse rotations of a separate control part 39 between the engaged clutch position where the balls are locked at that place and the disengaged clutch position where their outward displacement is allowed. The control part 39 is a short cylinder surrounding the balls 38 held in the cylindrical part 35. While its rotational motion is free, the translation along the axis is restricted by a pin 40 and a channel 41. As shown in FIG. 2, concaves 42 are made in the inner wall at the positions corresponding to the balls 38. In the outer wall, three channels 43 which extend to the axis direction, are cut. These relate to the transmission part 26 to be described below.

The transmission part 26 consists of a short cylinder part 44 which is held coaxially with the cylindrical part 35 of the piston and allowed to rotate between the end wall 31 and the lid 32 of the cylinder body and three extended parts 45 which extend from the short cylindrical part 44 along the axis and relate to the channels 43 of the control part 39. A channel 46 in the short cylindrical part 44 relates to the catch 49 to be described below. The extended parts 45 relate to the channels 43 in the entire range of movements of the control part 39.

As shown in FIG. 3, the operation part 27 consists of a handle 47, a handle axis 48 and a catch 49. It is housed inside a housing 50 together with a spring 51. The housing 50 is built between the end wall 31 and the lid 32 of the cylinder body 21 allowing translational motions of the operation part 27 along the cross section perpendicular to the axis of the cylinder body 21. The handle 47 is located at the external side of the cylinder body 21. The catch 49 is locked in the channel 46 in the transmission part 26 and the whole unit is held at the leftmost position under the pressure from the pushback spring 51. In this state, the control part 39 holds the balls 38 in the ring-shaped channel 37 in the pushrod 24 with the inner wall apart from the concaves 42 touching the balls 38 as illustrated in FIG. 2. By pulling out the handle 47 from the cylinder body 21, the catch 49 rotates the transmission part 26 by a certain angle. As a result the control part 39 is rotated through the extended part 45 to bring the concaves 42 to the outside of the balls 38. The clutch 25 engaged is thus disengaged.

This brake cylinder 20 is used in the same way as 7 explained using FIG. 4. Normally, compressed air is supplied to the cylinder room 53 through a compressed air in/outlet 52 of cylinder body 21. In this condition the piston 22 is moved from the position shown in FIG. 1 to the left, being pushed against the spring 23. When the brake is applied by this spring brake cylinder 20, it corresponds to the condition shown in FIG. 1, where compressed air in the cylinder room 53 is evacuated. In this state, the clutch 25 is engaged and the pushrod 24 is pushed out from the cylinder body 21. As shown by single dotted lines in FIG. 4, the spring brake is activated swinging the lever 1 and the suspending rod 3. This spring brake can be released manually by pulling out the handle 47. The clutch 25 is now in the disengaged state and the pushrod 24 becomes free and does not transmit the force from the spring 23 to the lever 1. The lever 1 returns to the released position by the action of the spring in the brake cylinder BC. The pushrod 24 follows this movement and the channel 37 in the pushrod 24 moves away from the balls 38. As a result, the operation part 27 remains at the same position even after the handle 47 is release. This is the state where the brake is released by manual operation.

When compressed air is supplied to the cylinder room 53 under this released condition, the piston 22 in FIG. 1 moves to the left. When the channel 37 moves to the position of the balls 38, the operation part 27 moves by the action of the spring 51, rotating the transmission part 26. The balls 38 are thus locked in the channel 37 and the clutch 25 is engaged.

In FIG. 1, 54 is a straight channel and 55 is a pin. These will prevent rotations of the piston 22.

THE EFFECT OF THE INVENTION

With this invention, the braking by the spring brake cylinder can be released simply by pulling out the operation part from the side of the cylinder. Compared with conventional designs, this is superior in ease of operation because one can take advantage of the free space at the side of the cylinder. Extra space at the end of the cylinder for ease of manual operation or special tools are not necessary. This easy operation is very effective in achieving the operation quickly.

FIGURE CAPTIONS

FIG. 1: Cross sectional side view of one installation example of the invention.

FIG. 2: Enlarged view of a—a cross section in FIG. 1. FIG. 3: b—b cross section in FIG. 1. FIG. 4: Typical application of a spring brake cylinder. Part of a car and a schematic side view of a brake unit are shown.

21—cylinder body, 22—piston, 23—spring for spring braking, 24—pushrod, 25—clutch, 26—transmission part, 47—operation part, 39—control part.

We claim:

1. A spring brake cylinder assembly, said assembly comprising:
   (a) a body portion having a pair of axially opposed end walls, said body portion including a fluid pressure connection adjacent a first end wall;
   (b) a piston positioned for reciprocal axial movement within said body portion, said piston having a face portion adjacent said first end wall of said body portion and a stem portion extending in an axial direction from an inner surface of said face portion of said piston, said stem portion including a plurality of apertures extending a sidewall thereof, said piston further including an axial bore extending through said face portion and said stem portion;
   (c) a generally hollow piston guide means having an inner surface engageable with an outer surface of said stem portion of said piston and a second end wall of said body portion for guiding said piston in an axial direction during reciprocal axial movement of said piston;
   (d) a brake spring caged between said inner surface of said face portion of said piston and said second end wall of said body portion to supply a predetermined braking force to said assembly;
   (e) a pushrod slidably positioned through said bore in said face portion and said stem portion of said piston and extending coaxially out of a bore in said first end wall of said body portion, said pushrod including a groove formed around an outer surface thereof adjacent one end;
   (f) a clutch means including a plurality of balls positioned for engagement with said apertures in said stem portion piston and said groove in said pushrod and said piston guide means for making a connection and disconnection of said piston with said pushrod thereby controlling their relative displacement in an axial direction;
   (g) a clutch control means engageable with said clutch means for controlling said clutch means between an engaged and disengaged state; and
   (h) a clutch operating means positioned adjacent said second end of said body portion and engageable with said clutch control means for manually releasing said assembly from a brake application.

2. A spring brake cylinder assembly, according to claim 1, wherein said assembly further includes an elongated extension member threadedly engaging one end of said stem portion and housing a portion of said clutch means and said plurality of apertures are formed in said extension member.

3. A spring brake cylinder assembly, according to claim 2, wherein said assembly further includes a means for preventing rotation of said piston during said axial movement within said body portion.

4. A spring brake cylinder assembly, according to claim 3, wherein said clutch means includes a cylindrical portion having a plurality of slots formed on an outer surface thereof for engagement with a plurality of elongated members forming a portion of said clutch control means.

5. A spring brake cylinder assembly, according to claim 1, wherein said piston guide means is formed integrally with said body portion.

6. A spring brake cylinder assembly, according to claim 5, wherein said stem portion of said piston is formed integrally with said face portion of said piston.

7. A spring brake cylinder assembly, according to claim 1, wherein said plurality of apertures extending through said sidewall of said stem portion are spaced substantially equidistantly apart.

* * * * *